Nov. 29, 1966    L. WALLERSTEIN, JR    3,288,419
STATICALLY FIXED ISOLATION SYSTEM
Original Filed April 29, 1963    3 Sheets-Sheet 1
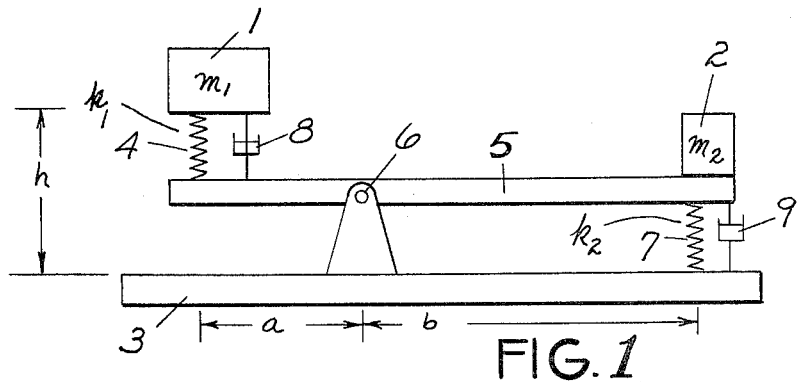
FIG. 1
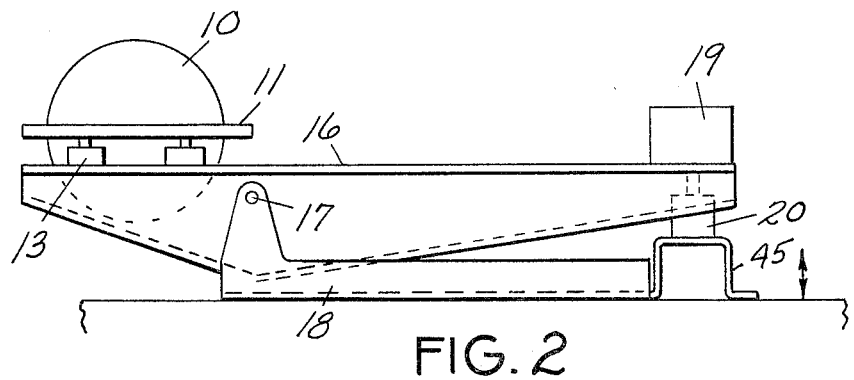
FIG. 2
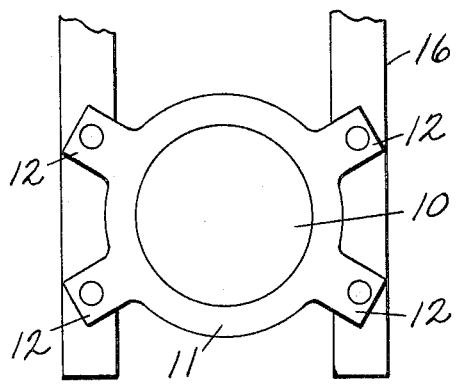
FIG. 4
FIG. 3
INVENTOR.
Leon Wallerstein Jr
BY
Ralph Hammar
Attorney Nov. 29, 1966   L. WALLERSTEIN, JR   3,288,419
STATICALLY FIXED ISOLATION SYSTEM
Original Filed April 29, 1963   3 Sheets-Sheet 3

INVENTOR.
Leon Wallerstein Jr
BY Ralph Hammar
attorney

United States Patent Office 3,288,419
Patented Nov. 29, 1966

3,288,419
STATICALLY FIXED ISOLATION SYSTEM
Leon Wallerstein, Jr., Erie, Pa., assignor to Lord Corporation, Erie, Pa., a corporation of Pennsylvania
Continuation of application Ser. No. 276,365, Apr. 29, 1963. This application Jan. 14, 1966, Ser. No. 528,690
14 Claims. (Cl. 248—358)

This application is a continuation of application Serial No. 276,365, filed April 29, 1963.

This invention is a vibration isolation system which in a preferred form maintains the isolated equipment in a fixed static relation to its supporting structure, even though the latter may experience a range of sustained accelerations. One advantage is the reduction of clearance requirements between the equipment and its supporting structure. Another advantage is the ability to maintain translational alignment between the equipment and its supporting structure. Another advantage is vibration isolation. The term "fixed static relation" should not be confused with the dynamic oscillation of the equipment incident to vibration isolation.

Figure 5:
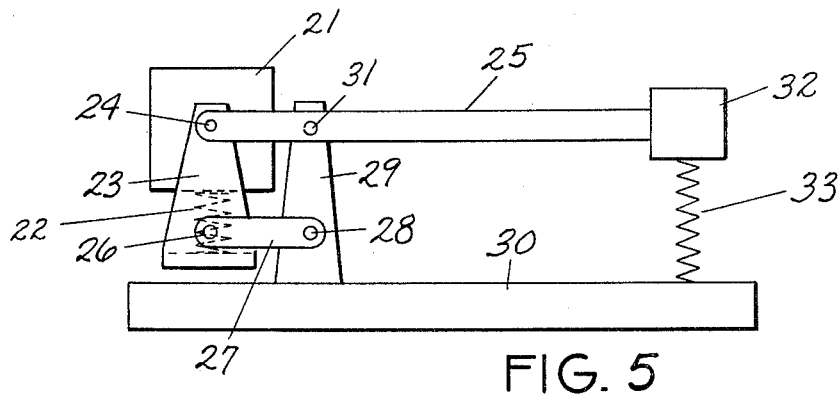
Figure 7:
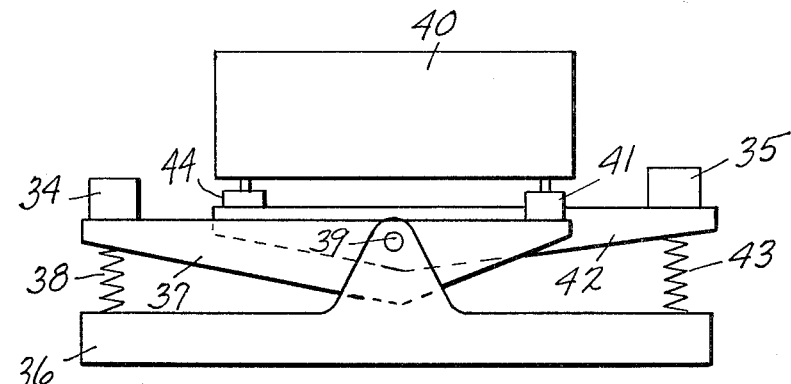
Figure 6:
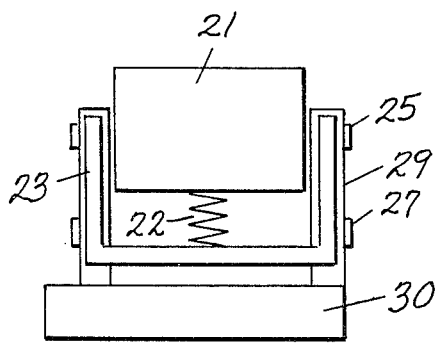
Figure 8:
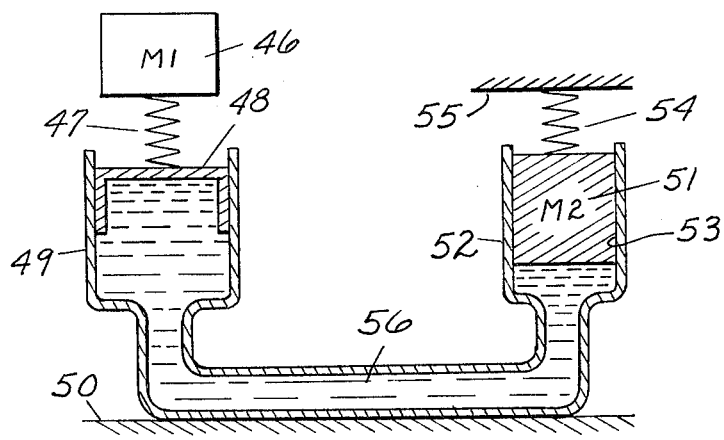
Figure 9:
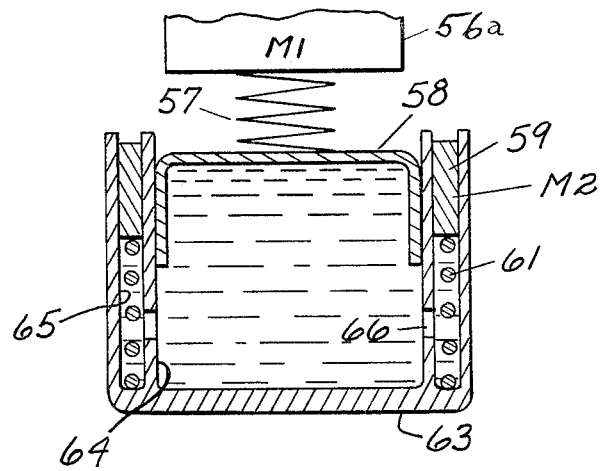

In the drawing, FIG. 1 is a diagrammatic view, FIG. 2 is an elevation of a vibration isolated inertial platform, FIG. 3 is an end view of the inertial platform, FIG. 4 is a top plan view of the intertial platform, FIG. 5 is a diagrammatic elevation of a modification eliminating rotational motion of one of the supported masses, FIG. 6 is an elevation of the modification, FIG. 7 is an elevation of another modification, and FIGS. 8 and 9 are a diagrammatic view of hydraulic systems.

In the drawing, 1 indicates the supported mass or isolated equipment ($m_1$), 2 a counterweight ($m_2$) which may be a useful piece of equipment associated with the supported mass 1, and 3 the base or supporting structure. The mass 1 is supported on one end of a lever 5 pivoted at 6 on the base by a spring 4 having spring constant $k_1$ and connected to the lever a distance $a$ from the pivot 6. The mass 2 is carried by the opposite end of the lever 4 and a spring 7 having a spring constant $k_2$ and arranged between the lever 5 and the base and at a distance $b$ from the pivot 6. A damper 8 may be arranged between the lever 5 and the mass 1 and a damper 9 between the lever 5 and the base 3. The function of the dampers is to limit the excursion at resonance.

As the base is accelerated, the mass 1 is subject to compensating effects which maintain the height $h$ above the base constant. For example, sustained acceleration of the base 3 upward causes compression of spring 4 and tends to reduce the height $h$ between the mass 1 and the base. At the same time, clockwise rotation of the lever 5 occurrs, tending to decrease $h$. The effects compensate, keeping the height $h$ of mass 1 above the base constant, if the following relation is satisfied:

$$\frac{a}{b} = \frac{1}{2}\left(\frac{m_2}{m_1} \pm \sqrt{\left(\frac{m_2}{m_1}\right)^2 - 4\frac{k_2}{k_1}}\right)$$

where the terms are indicated on FIG. 1. Three parameters are involved, these being the mass ratio ($m_2/m_1$), the spring stiffness ratio ($k_2/k_1$) and the lever ratio ($a/b$). Fixing any two of these parameters determines the third, and there are generally two possible values of $a/b$ for any combination of $m_2/m_1$ and $k_2/k_1$. Curves have been calculated for ratios of $a/b$ from .1 to 2, for ratios of $m_2/m_1$ ranging from .25 to 2 and for spring constants $k_2/k_1$ ranging from .01 to 1. There is no theoretical reason why this range of values cannot be extended.

In FIG. 2, there is shown a mounting system for an inertial platform 10 carried in a frame 11 having projecting arms 12 associated with resilient mountings 13 which resiliently support the platform on the left hand end of a lever 16 pivoted at 17 on a base 18. A counterweight 19 is fixed to the right hand end of the lever 16 and resiliently supported on the base 18 by mounting 20 on bracket 45. This structure permits the inertial platform to be resiliently mounted on the base and yet to maintain a substantially constant static height relation relative to the base under sustained accelerations. These accelerations which normally stress the mountings 13 and thereby cause variations in the height of the inertial platform about the base are compensated by pivotal movement of the lever 16. Since the compensation is obtained by rocking of the lever which supports the equipment, there is tilting of the isolated equipment even though the static height above the base remains the same.

FIGS. 5 and 6 show a structure which maintains the isolated equipment level as well as at fixed height above the base. In this construction, the equipment 21 is supported by a spring 22 on a cradle or link 23 having its upper end pivoted at 24 to the left hand end of the lever 25 and its lower end pivoted at 26 to a link 27 parallel to the lever 25 and pivoted at 28 on a bracket 29 fixed to the base 30. The lever 25 is pivoted at 31 on the bracket 29 forming with the bracket 29 and the associated links 23, 27 a parallelogram linkage which prvents tilting of the equipment relative to the base. In other respects, the operation is the same as the previously described construction. The counterweight 32 which is supported on the base by spring 33 has a compensating action which maintains the equipment 21 at a fixed height above the base 30. The parallelogram linkage prevents rocking or rotational movement of the equipment 21 about the pivot 24.

FIG. 7 shows another system for maintaining equipment at a fixed static height above the base and at the same time preventing rotation of the equipment relative to the base. In this system there are two counterweights 34, 35. The counterweight 34 is fixed to the left hand end of a lever 37 supported by a spring 38 between it and base 36. The lever 37 is pivoted at 39 on the base and the right hand end of the lever supports the right hand end of the equipment 40 by a spring 41. The counterweight 35 is mounted on the right hand end of a lever 42 pivoted at 39 on the base and supported by a spring 43 between it and the base. The levers 37 and 42 may have separate pivots. The left hand end of the lever 42 supports the left hand end of the equipment 40 by means of a spring 44. From one aspect, each lever (37 or 42) and the associated counterweight (34 or 35) and spring (38 or 43) maintains its share of the equipment 40 at a fixed height above the base.

The systems provide vibration isolation for the equipment 1, 10, 21, 40 and at the same time maintain the equipment at a fixed static height above the base. The counterweights 2, 32, 34, 35, which also may include equipment, are also provided with vibration isolation but are not maintained at a fixed static height above the base. The vibration isolation is provided by dynamic oscillation of the equipment relative to the base.

In FIGS. 8 and 9 a hydraulic connection is substituted for the lever. Referring just to FIG. 8, the mass 46 ($m_1$) is supported by a spring 47 ($k_1$) on a piston 48 of area $a_1$ slidable in a cylinder 49 fixed to the base 50. The counterweight 51 ($m_2$) is a part of a piston 52 of area $a_2$ slidable in a cylinder 53 also fixed to the base. A spring 54 ($k_2$) is arranged between a part 55 of the base 50 and the counterweight. The cylinders are connected by a liquid filled line 56 so that whenever the counterweight 51 moves down, the piston 48 moves up and vice versa, the ratio of the movement being inversely proportional to the areas of the pistons 48, 52. The mass 46 ($m_1$) will remain a fixed height above the base if the following equation is satisfied:

$$\frac{a_2}{a_1}=\frac{\frac{m_2}{m_1}\pm\sqrt{\left(\frac{m_2}{m_1}\right)^2-4\frac{k_2}{k_1}}}{2}$$

which is identical with the expression for the mechanical system, except that the piston area ratio $a_2/a_1$ replaces the lever ratio $a/b$.

The hydraulic lever has the following advantages:

(1) It can be made very compact since the large and small pistons can be placed next to each other, or in any convenient location, being connected by a tube.

(2) As a further size reduction, the two piston-cylinder arrangements could be made concentric (see FIG. 9).

(3) The fluid connection between cylinders could provide damping.

(4) Sliding pistons are not necessary. Diaphragms can be used.

In FIG. 9, the mass 56a ($m_1$) is supported by spring 57 ($k_1$) on piston 58 of area $a_1$. The counterweight 59 ($m_2$) is an annular piston of area $a_2$ supported by spring 61 ($k_2$) on base 63 having cylinders 64, 65 for the pistons. The operation is the same as FIG. 8. The liquid fill flows through way 66 to transmit movement from one piston to the other.

What is claimed as new is:

1. A mounting system comprising a base, a mass $m_1$, a part movable relative to the base, a resilient mounting $k_1$ in load carrying relation between said part and the mass $m_1$, a counterweight $m_2$, a resilient mounting $k_2$ in load carrying relation between said base and the counterweight $m_2$, and a force transmitting connection between said counterweight and said part for displacing said part in opposition to the deflection of the counterweight $m_2$ on said resilient mounting $k_2$.

2. A mounting system comprising a base, a lever having a pivot on the base intermediate its ends, a mass $m_1$ supported on one side of the pivot by resilient connection $k_1$ at a distance $a$ from the pivot, a counterweight $m_2$ on the other side of the lever, a resilient connection $k_2$ between the lever and the base such that rotation of the lever due to acceleration of the base causes a displacement of the lever at point $a$ equal and opposite to the deflection of resilient connection $k_1$.

3. The system of claim 2 in which the load carrying connection between the first mass and the lever includes a parallelogram linkage means for preventing tilting of the first mass relative to the base.

4. A mounting system comprising a base, a lever having a pivot on the base intermediate its ends, a first mass $m_1$, a load carrying connection having a spring constant $k_1$ between the first mass and the lever a distance $a$ to one side of the pivot, a counterweight $m_2$ supported by the lever a distance $b$ to the other side of the pivot, a load carrying connection for the mass $m_2$ between the base and the lever having a spring constant $k_2$ at a distance $b$ to the other side of the pivot, said parts having substantially the relation of the following equation:

$$\frac{a}{b}=\frac{1}{2}\left(\frac{m_2}{m_1}\pm\sqrt{\left(\frac{m_2}{m_1}\right)^2-4\frac{k_2}{k_1}}\right)$$

5. A mounting system comprising a base, a mass $m_1$, a part movable relative to the base, a resilient mounting $k_1$ in load carrying relation between said part and the mass $m_1$, a counterweight $m_2$, a resilient mounting $k_2$ in load carrying relation between said base and the counterweight $m_2$, and means responsive to deflection of mass $m_2$ on the resilient mounting $k_2$ for displacing the mass $m_1$ in opposition to said deflection.

6. The system of claim 5 in which the means comprises a first class lever pivoted to the base intermediate its ends and having one end connected to the counterweight and the opposite end connected to said part.

7. The system of claim 5 having damping means connected between said part and the mass $m_1$.

8. The system of claim 5 having damping means connected between said part and said base.

9. A mounting system comprising a base, a mass $m_1$, a piston of area $a_1$, a resilient mounting $k_1$ in load carrying relation between said piston and the mass $m_1$, a counterweight $m_2$ including a piston of area $a_2$, a resilient mounting $k_2$ in load carrying relation between said base and the counterweight $m_2$, a hydraulic line with the piston of area $a_1$ at one end of the line and the piston of area $a_2$ at the other end of the line for displacing said piston of area $a_1$ in opposition to the deflection of said resilient mounting $k_2$.

10. A mounting system comprising a base, a mass $m_1$, a plurality of parts movable relative to the base, a plurality of resilient mountings $k_1$ respectively in load carrying relation between a different one of said parts and a different portion of the mass $m_1$, a plurality of counterweights $m_2$, said parts and said counterweights being associated in pairs a plurality of resilient mountings $k_2$ respectively associated with each counterweight and in load carrying relation between the associated counterweight and said base, and a force transmitting connection between each part and its associated counterweight for moving each part in opposition to the deflection of each counterweight on its associated resilient mounting $k_2$.

11. A mounting system comprising a base, a mass $m_1$, a pair of parts movable relative to the base, a pair of resilient mountings $k_1$, one associated with each part and connected respectively in load carrying relation between the associated part and a different portion of the mass, a pair of counterweights, one associated with each part, a pair of resilient mountings $k_2$, one associated with each counterweight and connected in load carrying relation respectively between the base and the associated counterweight, a pair of first class levers, one associated with each part and its associated counterweight, said levers being in crossed relation to each other and each pivoted intermediate its ends to the base and connected at one end to its associated part and at its other end to its associated counterweight whereby the concert of the levers maintains the mass $m_1$ a fixed height above the base and prevents rotation of the mass $m_1$ relative to the base.

12. The system of claim 9 in which the parts have substantially the relation of the following equation:

$$\frac{a_2}{a_1}=\frac{1}{2}\left(\frac{m_2}{m_1}\pm\sqrt{\left(\frac{m_2}{m_1}\right)^2-4\frac{k_2}{k_1}}\right)$$

where $a_2/a_1$ is the ration of the areas of the pistons.

13. A mounting system comprising a base, a mass $m_1$, a part movable relative to the base, means in load carrying relation between said part and the mass $m_1$, a counterweight $m_2$, a resilient mounting $k_2$ in load carrying relation between said base and the counterweight $m_2$ and means responsive to deflection of mass $m_2$ on the resilient mounting $k_2$ for displacing the mass $m_1$ in opposition to said deflection.

14. The mounting system of claim 13 in which the means in load carrying relation between said part and the mass $m_1$ supports the mass $m_1$ for movement relative to said part.

References Cited by the Examiner

UNITED STATES PATENTS

| | | | |
|---|---|---|---|
| 1,973,510 | 9/1934 | Schieferstein | 248—20 X |
| 2,460,596 | 2/1949 | Roche | 248—350 |
| 2,744,749 | 5/1956 | Fiedor | 248—377 X |
| 2,910,112 | 10/1959 | Ogden | 248—399 |

FOREIGN PATENTS 644,469    5/1937    Germany.

CLAUDE A. LE ROY, Primary Examiner.

R. P. SEITTER, Examiner.